United States Patent
Reynolds et al.

(10) Patent No.: US 6,643,693 B1
(45) Date of Patent: *Nov. 4, 2003

(54) METHOD AND SYSTEM FOR MANAGING I/O TRANSMISSIONS IN A FIBRE CHANNEL NETWORK AFTER A BREAK IN COMMUNICATION

(75) Inventors: Robert A. Reynolds, Pflugerville, TX (US); Keith M. Arroyo, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/153,576

(22) Filed: Sep. 15, 1998

(51) Int. Cl.[7] .............................................. G06F 15/173
(52) U.S. Cl. ...................... 709/223; 709/221; 709/227; 714/2; 714/4
(58) Field of Search ................................ 709/245, 223, 709/222, 220, 221, 224, 242, 227, 239, 240, 238; 714/4, 2, 7, 20; 370/244, 245, 248, 252, 254, 395.3, 395.31, 395.32; 711/221, 202, 206, 209, 207

(56) References Cited

U.S. PATENT DOCUMENTS

| | | | | |
|---|---|---|---|---|
| 5,093,824 A | * | 3/1992 | Coan et al. | 370/228 |
| 5,265,092 A | * | 11/1993 | Soloway et al. | 370/60 |
| 5,517,497 A | * | 5/1996 | Le Boudec et al. | 370/399 |
| 5,638,518 A | * | 6/1997 | Malladi | 709/236 |
| 5,726,972 A | * | 3/1998 | Ferguson | 370/13 |
| 5,751,715 A | | 5/1998 | Chan et al. | 370/455 |
| 5,768,530 A | * | 6/1998 | Sandorfi | 709/233 |
| 5,768,618 A | | 6/1998 | Erickson et al. | 710/9 |
| 5,796,736 A | * | 8/1998 | Suzuki | 370/399 |
| 5,802,258 A | * | 9/1998 | Chen | 714/10 |
| 5,805,805 A | * | 9/1998 | Civanlar et al. | 709/220 |
| 5,805,924 A | * | 9/1998 | Stoevhase | 710/11 |
| 5,907,676 A | * | 5/1999 | Fujishiro et al. | 709/203 |
| 5,944,798 A | * | 8/1999 | McCarty et al. | 709/251 |
| 5,954,796 A | * | 9/1999 | McCarty et al. | 709/222 |
| 5,954,798 A | * | 9/1999 | Shelton et al. | 709/223 |
| 5,983,269 A | * | 11/1999 | Mattson et al. | 709/221 |
| 6,006,016 A | * | 12/1999 | Faigon et al. | 714/48 |
| 6,014,383 A | * | 1/2000 | McCarty | 370/453 |
| 6,118,776 A | * | 9/2000 | Berman | 370/351 |
| 6,130,876 A | * | 10/2000 | Chaudhuri | 370/228 |
| 6,137,774 A | * | 10/2000 | Commerford et al. | 370/216 |
| 6,138,161 A | * | 10/2000 | Reynolds et al. | 370/392 |
| 6,148,411 A | * | 11/2000 | Ichinohe et al. | 714/4 |
| 6,185,203 B1 | * | 2/2001 | Berman | 370/351 |
| 6,195,703 B1 | * | 2/2001 | Blumenau et al. | 709/211 |
| 6,285,475 B1 | * | 9/2001 | Fee | 359/110 |
| 6,324,161 B1 | * | 11/2001 | Kirch | 370/217 |
| 6,356,944 B1 | * | 3/2002 | McCarty | 709/222 |

* cited by examiner

Primary Examiner—David Wiley
Assistant Examiner—William C. Vaughn, Jr.
(74) Attorney, Agent, or Firm—Gray Cary Ware & Freidenrich, LLP

(57) ABSTRACT

A method and system for maintaining node states across network address changes in a Fibre Channel network includes steps and instructions for maintaining in each of a plurality of nodes, including target and initiator nodes, a triplet table including a triplet of data having the network address, node, name, and port name for each of other ones of said plurality of nodes with which the particular node communicates. The instructions permit sending from each of the plurality of nodes to the other ones of the nodes with which each of the plurality of nodes communicates the triplet of data following the resumption of communication occurring after a break in communication. The triplet of data identifies the event that the nodes are communicating with the same nodes both before and after said break in communication, the invention further includes instructions for continuing communications among said nodes without performing further recovery steps.

21 Claims, 1 Drawing Sheet

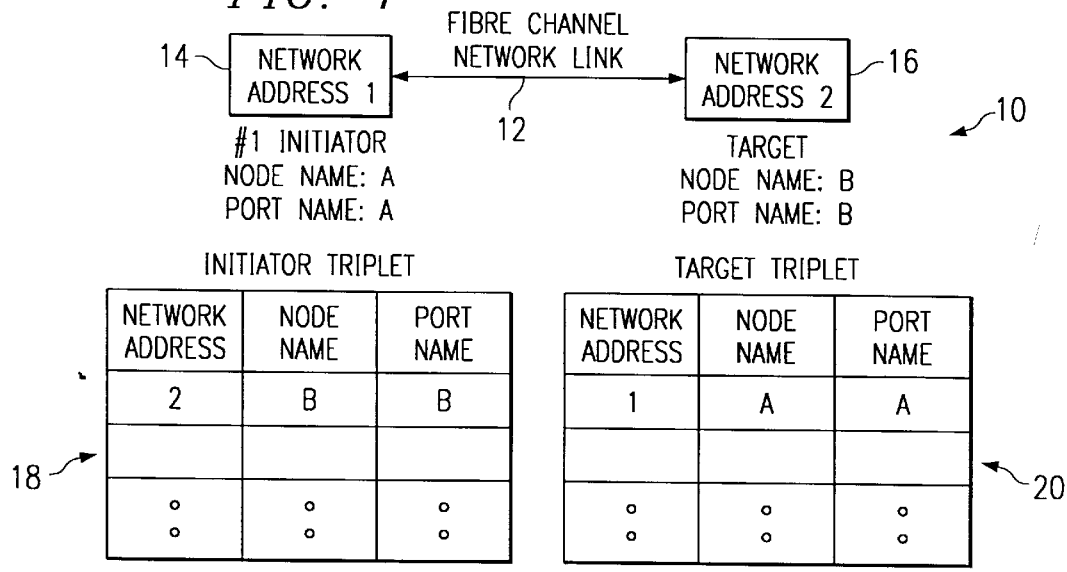
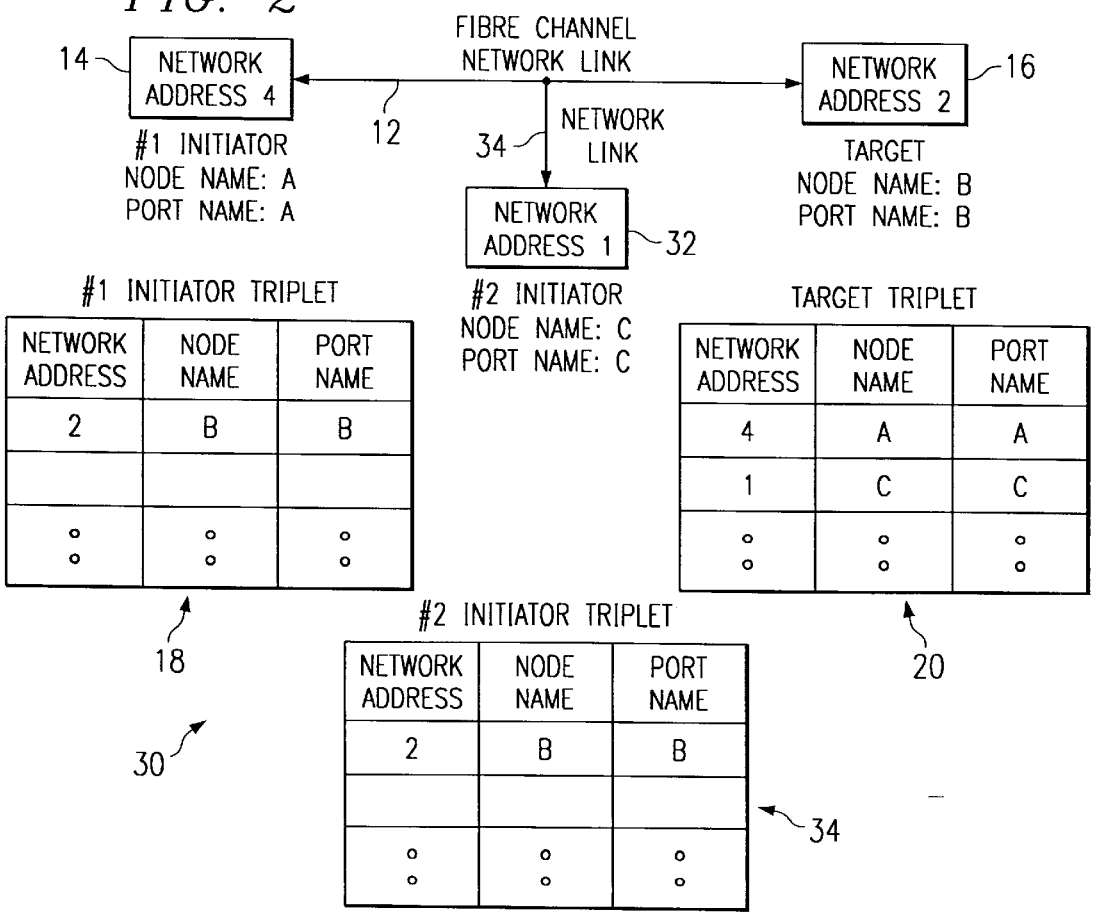

METHOD AND SYSTEM FOR MANAGING I/O TRANSMISSIONS IN A FIBRE CHANNEL NETWORK AFTER A BREAK IN COMMUNICATION

TECHNICAL FIELD OF THE INVENTION

The present invention relates generally to data and information communications systems and their operation and more particularly to communications networks including a Fibre Channel network. Even more particularly, the present invention relates to a Fibre Channel network system and method of operation having the ability to maintain the target and initiator states across address changes for improving the management of inputs and outputs to improve network performance, eliminate communication failures, and avoid the loss of data that may occur as a result of a network link state change.

BACKGROUND OF THE INVENTION

In a Fibre Channel network, the network address assigned to initiators and targets may be dynamic. After a link state change on the network, the network addresses assigned to existing nodes in the network can change. This behavior executes a problem for SCSI initiators and targets in managing I/O (inputs/outputs) in progress between a specific initiator-target pair across link state changes.

With known methods for managing I/Os in a Fibre Channel network, when an existing I/O is in progress and either an initiator or target detects a link state change, the initiator must authenticate that it is still talking to the same target before the I/O can continue. This authentication is detailed in The Fibre Channel PLDA (Private Loop Direct Attach) Profile. This profile is an extension to the SCSI-3 Standard FCP (Fibre Channel Protocol), which defines SCSI implementation over Fibre Channel. The PLDA profile states that after a link state change from a link down to link up condition, the initiator must send an ADISC (Address Discovery) or PDISC (Port Discovery) ELS (Extended Link Service) command to every target with which it has I/O's in progress. The ADISC and PDISC commands are used to exchange node name and port name information. The PLDA profile further requires that if the target detects that the network address of an initiator has changed, then the target should terminate the existing I/Os from that initiator. After this step, the initiator performs a recovery process and in some other way restarts the I/O transmission.

The termination of existing I/Os because of a network address change is disruptive. This termination reduces the overall performance of the network, because it unnecessarily slows system or network traffic. In some applications, such as where a tape drive serves as the target for a SCSI initiator, a general application failure may result. Moreover, loss of data results in many instances where this I/O termination process must occur.

In Fibre Channel, initiators talk to targets using network address (PID's). These are called AL-PA's, Arbitrated Loop Physical Address, in an arbitrated Loop environment and PID's in other topology. Each target and each initiator is assigned a PID. In essence, targets and initiators only know one another in the Fibre Channel network by their network address.

In the event of a link state change, such as when a link goes down and then comes back up, or when a new node is added into the network, the network address of either or both the initiator or target can change. The initiator may be, for example, a host personal computer that initiates a SCSI command. A target may be some type of SCSI device such as a CD-ROM, a tape drive, or other storage device. If a state change occurs in the network while the I/Os are still in the process of being transmitted, a problem may arise upon the resumption of transmission. If a link state change occurs an address change could result. Because the initiator and target conventionally only use the addresses for identification, a confused state can arise in the I/O transmission. This confused state could have numerous manifestations, not the least of which would be the generation of corrupted data, loss of security, or generally low performance of the network.

The PLDA (Private Loop Direct Attach) Profile addresses this problem by assigning to each target and each initiator in a Fibre Channel network loop a unique node name and a unique port name, each of which are represented as 64-bit identifiers. The node name for the initiator or target defines the node for the particular device, while the port name defines the particular port on the identified node. Note, however, that a given node may possess numerous ports. Accordingly, the port name uniquely identifies the desired port on the given node.

The initiator and target exchange the node name and port name during initial communication, as defined in the FC-PH (Fibre Channel Physical) Standard. The node name and port name, when combined with the PID, uniquely identify a node. In the PLDA profile, after a link state change, the initiators send either an ADISC (Address Discovery) or PDISC (Port Discovery) command. The ADISC or PDISC command communicates between the target and initiator, the port name, node name, and PID for identification. The target and initiator compare the node name, port name, and PID, provided during initial communication to the node name, port name, and PID, provided by the ADISC or PDISC command. If they are the same, then the same target and same initiator are communicating with one another both before and after the state change. If not, then the addresses have changed.

According to the PLDA profile, the set of data including the PID, the node name, and the port name is called a "triplet." Thus, a triplet in a Fibre Channel network uniquely identifies a network node. In a Fibre Channel network, the PID is the address from which the ADISC or PDISC is received. The ADISC or PDISC, therefore, includes the port name and node name within their data payload.

The initiator sends out the ADISC or PDISC. In response, the target sends to the initiator an "accept" command, which operates as essentially a "handshake" that includes the same information as the ADISC or PDISC command. In addition, the target sends to the initiator the target's PID address together with the target's port name and node name.

The handshaking occurs prior to I/O continuation between the target and initiator following a state change. Thus, every time a link goes down and then comes back up later this form of authentication occurs. Actually, authentication occurs continually throughout the communication of I/Os in the Fibre Channel arbitrated loop.

According to the PLDA profile, when I/Os are in progress and a target's PID changes, the target is to abort all I/Os. Then, the initiator must perform error recovery on these aborted I/O's.

Aborting I/O's in accordance with the authentication process defined by the PLDA profile results in performance problems. In the case of SCSI tape operations the authentication process may result in application failures from which the associated host may not be able to recover. That is, in the example of a SCSI tape it may be impossible for the host to identify the physical location of the tape head or the sequentially-fed tape. Other problems arise from the present method of target authentication following a state change in the Fibre Channel network because the process is in essence a catastrophic procedure for addressing a rather common Fibre Channel network occurrence.

In a multi-initiator network, the current standard for PLDA that requires target authentication following a failure such as a tape failure cannot operate. In the event that the I/O are interrupted, all initiators on the multi-initiator network must take the time and cause the necessary delays associated with the target authentication process. Accordingly, there is a need for a method and system that addresses the performance limitations arising in the known systems and methods for identifying targets and initiators following a state change in a Fibre Channel network loop.

A need exists for a method and system that overcomes the data loss problems occurring in known target authentication methods and systems during a state change in a Fibre Channel network.

Still, a need exists for a method and system that avoids the general application failure that may happen in sequentially-operated and other target and initiator devices upon the change of state in a Fibre Channel network.

There is still the further need for a method and system for handling delays in I/Os through a multi-initiator Fibre Channel arbitrated loop network that avoids the need for each initiator to perform the target authentication process upon I/O transmission being restarted following a break in transmission.

SUMMARY OF THE INVENTION

According to the teachings of the present invention there is provided a method and system for managing I/O transmission in a Fibre Channel network that maintains target and initiator states across address changes in the Fibre Channel network to eliminate or at least substantially reduce limitations associated with known such systems and methods, including the problems of limited network performance, loss of data in certain applications, and general application failures.

One aspect of the present invention is a method for maintaining the state of a network device following a state change in a Fibre Channel network. The method includes the step of sending from a first network device a command comprising a data triplet. The data triplet comprises the network address, the node name, and the port name for the first network node. The node may represent a device such as an initiator or target in a Fibre Channel network. The Fibre Channel network may be a Fibre Channel arbitrated loop or switched network or other network topology. A next step in the method is to receive in a second network device the triplet from the first network device to determine whether the first network device and the second network device had been in I/O communication prior to the state change. The method further includes the step of determining whether the first network device and second network device were, in fact, in communication prior to the network state change by determining whether the triplet received by the second network device matches the same data (network Id, node name, and port name) existing in a prior triplet identifying the first network device prior to the network state change. In the event that the triplet matches, the method further includes the step of continuing communications. Otherwise, the method requires the termination of any interrupted I/O transmissions arising from the network state change.

According to another aspect of the present invention, there is provided a system for maintaining node states across address changes in a Fibre Channel network. The invention includes the instructions and circuitry for maintaining in each of a plurality of nodes a triplet table including at least one data triplet including for each of other ones of the plurality of nodes with which the each of said plurality of nodes communicates the physical address, node name, and port name of said other ones of said plurality of nodes. The nodes may be an initiator or target device in a Fibre Channel network. The instructions permit sending the data triplet from each of the plurality of nodes to the other ones of the plurality of nodes with which the given node communicates following the resumption of communication after a break in communication for identifying the given node in the event that the given node and the other nodes are communicating with the same ones of said each of said plurality of nodes both before and after the communications break, the process includes continuing the communication among the nodes without performing further recovery steps.

As a technical advantage, the present invention maintains initiator/target state information across address changes in a Fibre Channel network. This technical advantage is particularly valuable in the context of a network having more than one initiator. Basically, the initiator and target use the node name and port name identifiers to uniquely identify with whom they are communicating. The node name and port name are assured to be unique. In such a network, the situation of continually performing the prior art target authentication process, including the step of restarting all I/Os, can devastate the networks performance. This is because in a multi-initiator environment each individual must separately perform the target authentication process. This is not needed in networks employing the present invention.

A technical advantage that the present invention includes is providing improved multi-initiator network testing procedures. In such a network, numerous initiators often operate simultaneously or, at least, cooperatively. In these networks, frequently, maintenance of an initiator is needed for some reason or other. Taking down the initiator will generally affect not only the individual initiator, but all initiators on the network, because addresses change as a result of the removal of the initiator under maintenance. The present invention avoids the need for all initiators to perform the prior art target authentication process in this and similar instances.

Still another technical advantage appearing in the present invention relates to its ability to be made part of a Fibre Channel network with little additional cost. Generally, the method present invention may be implemented as a change in the instructions that control the authentication and transfer of triplets in a Fibre Channel network. These changes may be implemented in a hardware protocol chip for controlling the protocol operations within the network. Even this modification may be done with relatively little expense.

Another technical advantage of the present invention is the ability to restart I/O transmission immediately after completing authentication when it is confirmed that the same target and initiator are communicating with one another as were communicating prior to the I/O transmission break. Upon performing the authentication to verify the communication link, I/O transmission resumes. There is no need to perform the prior art recovery and restarting for I/O transmission.

Yet another technical advantage provided by the present invention arises from the difference of inherent paradigms used for Fibre Channel communications. Most conventional network applications use a SCSI-2 paradigm for I/O transmission. Fibre Channel applications, however, most often use the SCSI-3 paradigm. In the SCSI-3 paradigm, I/O transmission breaks occur frequently as a matter of normal operation. On the other hand, SCSI-2 paradigm operations do not normally use breaks, instead treating them as system or network failure conditions. The present invention avoids the drastic measure of recovery and restarting in response only I/O transmission breaks. This difference in SCSI-2 and SCSI-3 paradigm operations and the manner in which the present invention addresses these differences even further emphasizes the importance and relevance of its authentication method.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 1 illustrates a Fibre Channel network for incorporating the present invention; and FIG. 2 illustrates the use of the present invention in a Fibre Channel network such as appearing in FIG. 1.

DETAILED DESCRIPTION OF THE INVENTION

The present invention maintains triplets including the network address, the port name, and the node name, and upon authentication the desired target performs a different operation from prior art processes. In the event that the initiator detects that the network address has changed, even though the port name and node name are the same as before, instead of performing a recovery or restart process, the method of the present invention is to update the address. The present invention, instead of eliminating the previously transmitted I/Os changes the recorded network address for the target and continues with I/O transmission. The network address change will also occur in the triplet held by the target to recognize this while the port name and node name of the initiator are the same, the network address is different after the I/O transmission break. By simply updating the network address for the target and initiator, no disruption in I/O traffic will result.

The present invention maintains a table of address/(node name)/(port name) triplets for every node having I/O in progress. This permits maintaining the I/O even across a network address change for the initiator or target. With the present invention, the node (either the initiator or the target) receives the network triplet using ADISC or PDISC commands and determines whether the triplet describes the same node name and port name with which the node was converting I/O transmissions prior to the I/O transmission break. If so, and the network address only has changed, the method of the present invention is to update the triplet and proceed with I/O transmissions. By allowing I/O transmissions to continue even across network address changes, the present invention significantly improves the robustness of SCSI in a Fibre Channel environment.

Referring to FIG. 1, therefore, there appears conceptual diagram 10 for describing a Fibre Channel network that includes network link 12 for connecting #1 initiator 14 with target 16. Network link 12 connects to #1 initiator 14, which has network address 1, a node here designated as node name "A" and at a port here designated as port name "A." At target 16, network link 12 connects to a node here designated as node name "B" and at a port here designated as port name "B" and has network address 2.

According to the teachings of the present invention, #1 initiator 14 holds a triplet table, initiator triplet table 18, for recording the connection from initiator 14 to target 16. Thus, initiator triplet table 18 records the connection from initiator 14 to target 16 as network address "2," node name "B," and port name "B." Similarly, target 16 holds a triplet table, target triplet table 20, that records the connection from target 16 to initiator 14 as network address 1, node name "A," and port name "A."

Network link 12 may be any Fibre Channel network connection. When initiator 14 first communicates over network link 12 with target 16, these two nodes exchange the initiator triplet table 18 and target triplet table 20, respectively. As long as I/O transmissions continue between initiator 14 and target 16, each will store the other's triplet data as, for example, a three-field database entry. As long as no break occurs in the I/O transmissions and as long as no change occurs in the physical address of initiator 14 or target 16, these entries will remain valid.

FIG. 2, however, shows a modified Fibre Channel network to which connects initiator 32 to network link 12 via network link 34. Initiator 32 now occupies network address 1 and communicates with target 16. Now, #1 initiator 14 occupies the new network address 4, but target 16 has not changed its physical address in this instance. This change from network address 1 to network address 4 for #1 initiator 14 may occur, for example, due to the operation of the Fibre Channel addressing scheme.

To reflect this change, the present invention simply updates the physical address, as target triplet table 20 indicates. Thus, #1 initiator 14 authenticates target 16 to determine that the network address for target 16 has not changed. Accordingly, #1 initiator triplet 18 will not change relative to #1 initiator 14. Since #2 initiator 32 now occupies network address 1, instead of #1 initiator 14, which now occupies network address 4, target triplet 20 requires appropriate updating as FIG. 2 shows. The method of the present invention is possible, because each of #1 initiator 14, #2 initiator 32, and target 16 store this respective triplet tables. Thus, although the address for #1 initiator 14 has changed, target 16 knows that it was communicating with a node having node name A and port name A and #1 initiator 14 was communicating with target 16 at network address 2, node name B, and port name B. Upon the initiation of I/O transmissions following the addition of #2 initiator 32, target 16 updates target triplet table 20 to add network address "1," node name "C," and port name "C." #2 initiator 32 adds to its #2 initiator triplet table network address "2," node name "B," and port name "B" corresponding to target 16. With these data entries into the respective triplet tables I/O transmissions may continue until some break or interrupt occurs at which point their being stored in the associated node makes it possible to perform the operations of the present invention.

Note that all devices, including the FIG. 2 example #1 initiator 14, #2 initiator 32, and target 16, maintain a triplet record for each device with which I/O transmissions occur. This permits the more rapid authentication that the present invention achieves following the resumption I/O transmission after a break in communications. Thus, for example, #1 initiator 14 may be transmitting I/Os to many more targets than only target 16.

Although the present invention has been described in detail, it should be understood that various changes, substitutions and alterations can be made hereto without departing from the spirit and scope of the invention as defined by the appended claims.

What is claimed is:

1. A method for maintaining node states across network address changes in a Fibre Channel network, comprising the steps of:
   maintaining in each of a plurality of nodes a triplet table comprising a triplet of data including for each of other ones of said plurality of nodes with which said each of said plurality of nodes communicates the network address, node name, and port name of said other ones of said plurality of nodes;
   sending from each of said plurality of nodes to each of said other ones of said plurality of nodes with which said each of said plurality of nodes communicates said triplet of data following the resumption of communication after a break in communication for identifying said each of said plurality of nodes; and
   on the event that a data transmission was in progress between a first one of said plurality of nodes and a second one of said plurality of nodes before said break in communication, and said first one of said plurality of nodes and said second one of said plurality of nodes are in communication after said break in communication, said first one of said plurality of nodes and said second one of said plurality of nodes identifying each other based on said triplet of data and, continuing said data transmission among said nodes without performing a restart process.

2. The method of claim 1, wherein said maintaining step further comprises the step of maintaining said triplet table in a multi-initiator Fibre Channel network.

3. The method of claim 1, wherein said maintaining step further comprises maintaining said triplet tablet in a SCSI-3 paradigm.

4. The method of claim 1, wherein said maintaining step and said sending step occur in response to software instructions.

5. The method of claim 1, wherein said continuing step further comprises the step of immediately continuing communication after performing authentication for verifying a communication link between an initiator node and a target node.

6. The method of claim 1, wherein said continuing step further comprises the step of immediately continuing said communication without performing a recovery or restart process.

7. The method of claim 1, wherein said triplet of data for each node uniquely identifies said each node.

8. The method of claim 7, wherein said each of said plurality of nodes identifies said other ones of said plurality of nodes after said break in communication based on said triplet of data for each of said other ones of said plurality of nodes.

9. A system for maintaining the state of a network device following a state change in a Fibre Channel network, comprising:
   instructions for sending from a first network device a command comprising a triplet comprising the network address, a node name, and a port name for the first network device;
   instructions for receiving in a second network device the triplet from said first network device, said first network device and said second network device;
   instructions for determining whether said first network device and said second network device were in communication prior to the network state change by determining whether said triplet received by said second network device matches in said node name and said port name a prior triplet identifying said first network device prior to said network state change; and
   instructions for continuing communications in the event that said triplet matches in said node name and said port name.

10. The system of claim 9, wherein said triplet of data is maintained in a multi-table in a multi-initiator fibre channel network.

11. The system of claim 9, wherein said triplet of data is maintained in a triplet tablet in a SCSI-3 paradigm.

12. The system of claim 9, wherein said instructions for sending, instructions for relieving, and instructions for determining are maintained in software.

13. The system of claim 9, wherein said instructions for continuing further comprise immediately continuing communication after performing authentication for verifying a communication link between an initiator node and a target node.

14. The system of claim 9, wherein said instructions for continuing further comprise immediately continuing said communication without performing a recovery or restart process.

15. A method for maintaining node states across network address changes in a Fibre Channel network having first and second nodes in communication with each other, comprising the steps of:
   maintaining, in the first node, identifying data for the first node and the second node;
   maintaining, in the second node, identifying data for the first node and the second node;
   initiating a first data transmission which traverses a link between the first node and the second node
   following a failure of the link between the first node and the second node, transmitting identifying data for the first node from the first node to other nodes with which the first node is in communication, and transmitting identifying data for the second node from the second node to other nodes with which the second node is in communication
   if the first node receives identifying data for the second node from the second node and the second node receives identifying data for the first node from the first node, resuming the first data transmission over the link between the first node and the second node without performing a restart process.

16. The method of claim 15, wherein resuming the first data transmission over the link between the first node and the second node without performing a restart process comprises continuing the data transmission without terminating and restarting the data transmission.

17. The method of claim 15, wherein transmitting identifying data for the first node from the first node to other nodes with which the first node is in communication comprises broadcasting identifying data for the first node from the first node to all other nodes with which the first node is in communication.

18. The method of claim 15, wherein transmitting identifying data for the second node from the second node to other nodes with which the second node is in communication comprises broadcasting identifying data for the second node from the second node to all other nodes with which the second node is in communication.

19. The method of claim 15, wherein the identifying data for each node comprises a unique identifier for the node.

20. The method of claim 19, wherein the unique identifier for each node comprises a unique combination of a node name and a port name.

21. The method of claim 15, wherein each of the first and second nodes has a corresponding network address and wherein for at least one of the first and second nodes, the corresponding network address changes following the failure of the link.

* * * * *